Figure 1:
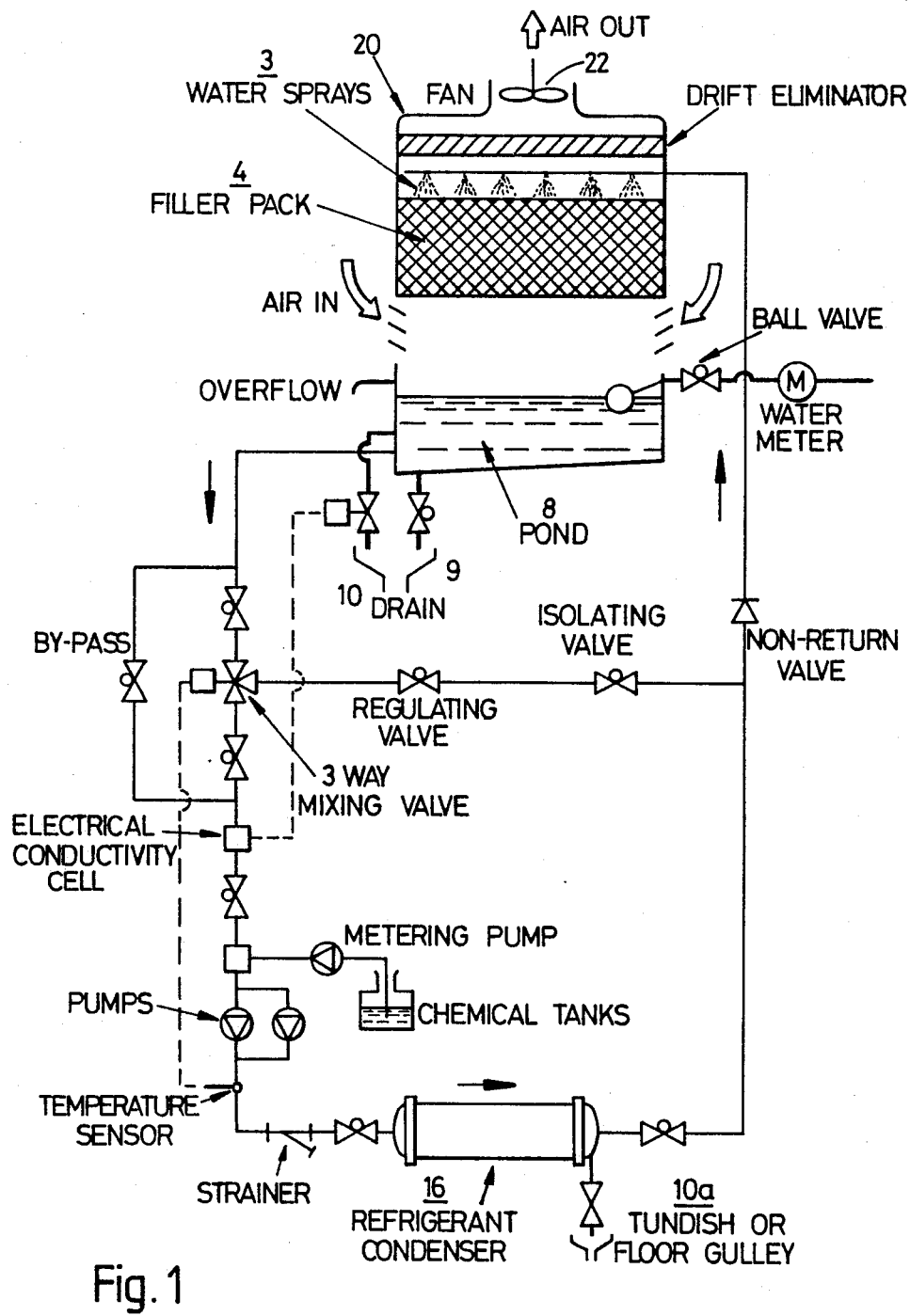

United States Patent [19]
Buckley

[11] Patent Number: 4,918,940
[45] Date of Patent: Apr. 24, 1990

[54] AIR CONDITIONING APPARATUS

[75] Inventor: Christopher M. Buckley, Newcastle under Lyme, England

[73] Assignee: Scientific Glass (Drainline) Limited, Great Britain

[21] Appl. No.: 328,336

[22] Filed: Mar. 24, 1989

[51] Int. Cl.⁵ .............................................. F25D 21/14
[52] U.S. Cl. ......................................... 62/285; 62/272
[58] Field of Search ................. 62/272, 285, 286, 288, 62/289, 290, 291

[56] References Cited

U.S. PATENT DOCUMENTS 4,462,216  7/1984  Kramer .............................. 62/272 X
4,509,338  4/1985  Gould .................................... 62/288
4,693,091  9/1987  Omara et al. .......................... 62/272

*Primary Examiner*—Henry A. Bennet
*Attorney, Agent, or Firm*—Learman & McCulloch

[57] ABSTRACT

Surplus moisture drain of air conditioning apparatus comprises a U-shaped trap in which a water seal is operatively maintained to prevent air flow along the drain, and an air break on the outflow side of the trap comprising a delivery spout with a tundish in spaced relationship below it to prevent siphonic voiding of the trap, the components forming said trap, spout and tundish with associated pipework all being formed of borosilicate or other stable corrosion resistant glass coupled together by releasable compression couplings.

6 Claims, 3 Drawing Sheets

AIR CONDITIONING APPARATUS

This invention relates to air conditioning apparatus as used in the air conditioning systems of buildings, e.g. apartments, hospitals, shops, hotels and offices or like structures.

There is increasing concern about the incidence of Legionnaires' Disease associated with conditioning systems and particularly the cooling towers and other air conditioning apparatus of such systems. The Legionella bacteria will multiply in any substantially static accumulation of moisture, e.g. cooling water or condensate under certain temperatures and conditions which are commonly present in air conditioning systems and if such contaminated water is dispersed as an air borne spray or mist e.g. through the conditioning system itself within the building or other structure or into the open air from cooling towers or the like there is a substantial danger of infection of anyone inhaling the air carrying the mist or droplets.

Exacting standards of design, construction and regular and thorough inspection, maintenance and cleaning of air conditioning apparatus and systems must be adhered to avoid or reduce microbiological growth, for effective and regular purging and disinfection of the system to remove any possible contamination, and for the prevention of air borne dispersal of possibly contaminated water droplets or mist. It is an object of the present invention to provide air conditioning apparatus having components which are particularly hygienic in operation which facilitate the effective monitoring of their standard of cleanliness and effectiveness in preventing air borne contamination, and which have convenient provision for thorough maintenance and cleaning.

More specifically a further object of the invention is the provision of drain means in air conditioning apparatus in which air is processed e.g. cooled, heated, filtered or de-humidified as part of an air conditioning system, said drain means removing surplus moisture derived from operation of the processing means, the pipework of the drain means being formed from circular section clear glass, preferably borosilicate glass tubular components, connected by readily releasable couplings incorporating compression seals of elastomeric material, e.g. a nitrile elastomer ring with a polytetrafluoroethylene (PTFE) inner seal ring or liner; and said drain means including a U-shaped trap which will maintain a visible fluid seal to prevent airflow along the drain means and an outflow from a delivery spout to an open topped tundish to provide an air gap preventing siphonic voiding of the fluid seal.

The preferred borosilicate glass is particularly resistant to corrosion and has a very smooth surface resisting accumulation of deposits which might harbour microbiological growth. It also has a low coefficient of thermal expansion so that the assembled drain means is stable and the integrity of the sealed joints between the components is maintained.

Conveniently a top end of at least one leg of the U-shaped trap is provided with a removable air tight screw or other closure cap giving access to the trap for maintenance, cleaning, or dosage with a bactericide or other disinfectant without dismantling the drain means.

Figure 2:
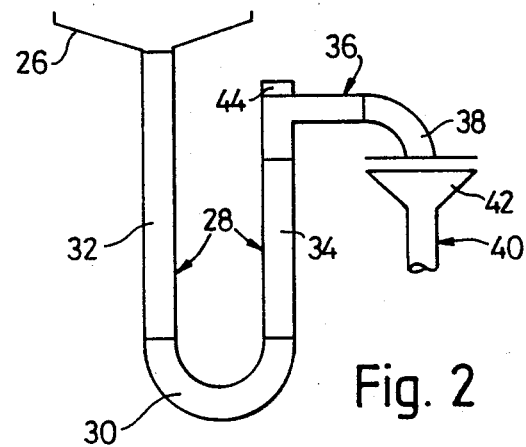
Figure 3:
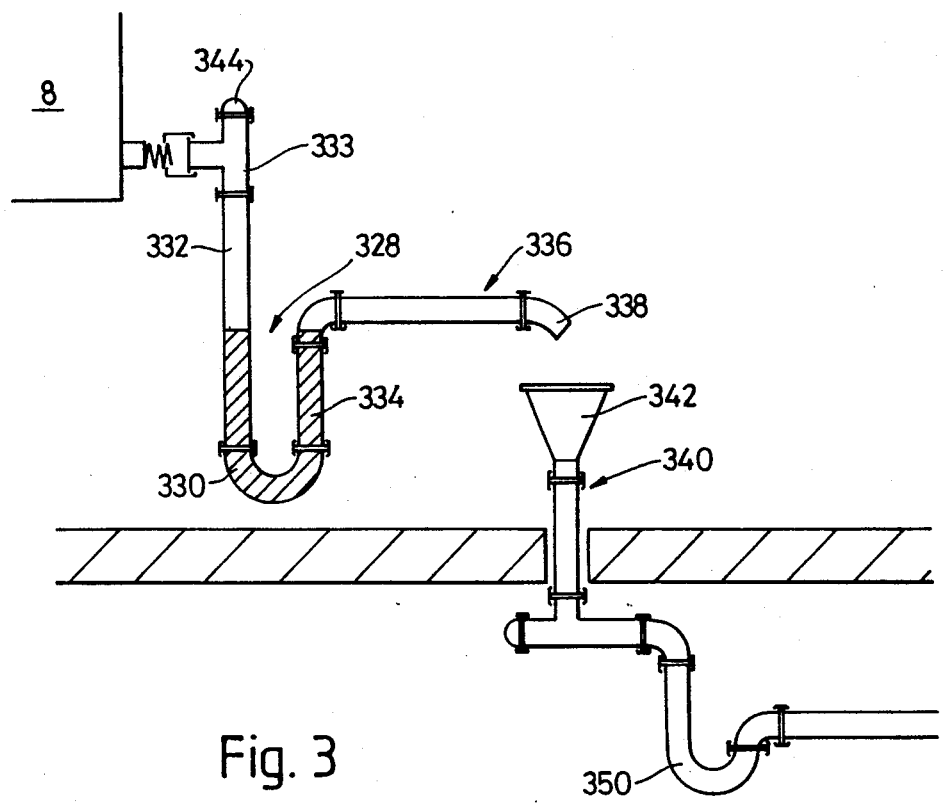
Figure 4:
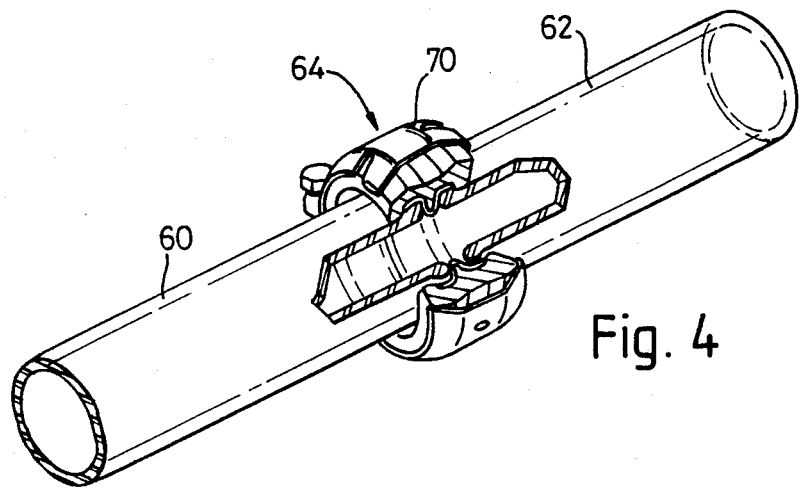
Figure 5:
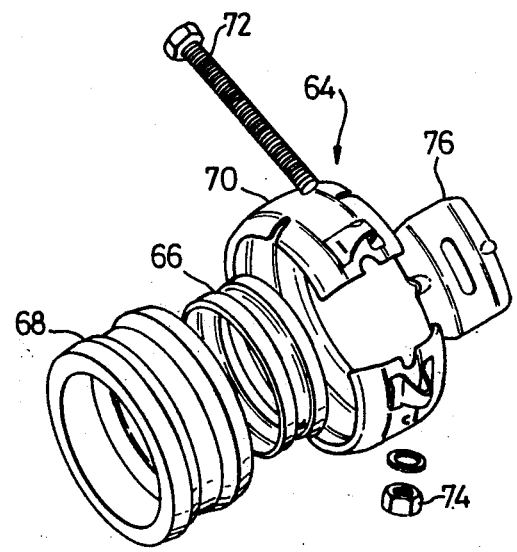

Some embodiments of the invention are now further described by way of example with reference to the accompanying drawings wherein:

FIG. 1 is a diagram of air conditioning apparatus incorporating an evaporative cooling tower, FIG. 2 is a diagrammatic side elevation of surplus moisture drain means of the apparatus, FIG. 3 is a diagrammatic side elevation of a modified form of drain means, FIG. 4 is a part sectional perspective detail view of part of the pipework of said drain means including a coupling thereof, and FIG. 5 is an exploded perspective view of said coupling.

Referring to FIG. 1 the diagram shows one known form of air conditioning apparatus and indicates in general terms the function and operation of the various components which will not be further described in detail. Basically this form of apparatus comprises primary air intake ducting 20 in the form of a cover enclosing air processing means comprising a filler pack 4 for evaporative cooling of the upward air flow which is induced by an air impeller fan 22. Cooling water is circulated from a pond 8 at the base of tower 20 by being pumped through a refrigerant condenser 16 for feeding distributor spray nozzles 3 above pack 4.

The apparatus includes drain means 9, 10 for emptying or discharging excess water from pond 8 and further drain means 10a for dispersal of surplus water from condenser 16 and these drain means, with which the invention is primarily concerned, will now be further described.

FIG. 2 shows in diagrammatic form drain means as associated with a refrigerant condenser e.g. drain means 10a associated with condenser 16 of apparatus as shown in FIG. 1 or associated with air processing means in the form of an air heater or cooler battery or coil of air conditioning apparatus.

The condenser, battery or coil is provided with a shallow drip tray 26, preferably formed from stainless steel, positioned to catch and collect together water condensate dripping from such air processing means in operation. The floor of tray 26 has a minimum fall of 1 in 20 in all directions to a drain connection mounted in the bottom of the tray to ensure that no accumulation of liquid can remain standing stagnant in the tray.

The drain means comprises a first pipework section 28 connected directly to said drain connection and comprising a U-shaped trap 30 with a vertical downleg 32 having its upper end coupled to said drain connection and a vertical upleg 34 in this example somewhat shorter than downleg 32.

Leading laterally from the upper end of upleg 34 is a second pipework section 36 terminating at a downwardly angled open ended delivery spout 38.

A third pipework section 40 includes an open topped tundish spaced below spout 38 to receive outflow therefrom while providing an air break between the second and third pipework sections, the third section 40 conducting the flow away to a disposal point (not shown) e.g. the drainage system of the associated building or structure.

All the above mentioned pipework sections, i.e. components referenced 28-42, are formed of clear borosilicate circular section glass tubing, the individual components being releasably coupled together by leakproof airtight compression couplings described in greater detail hereinafter.

A fluid seal is operatively maintained in trap 30 to prevent air flow through first pipework section 28, the height of legs 32, 34 providing a water seal of sufficient depth to ensure that the seal will not be broken under the operative air pressure which may be applied in the region of the drip tray 26, e.g. by operation of air impeller means of the apparatus. Preferably the water seal is maintained at an operative depth at least twice the static pressure derived from said fan and the legs 32, 34 may be provided with index markings or graduations showing the correct operative minimum depth of said seal for positive and easy visual checking of the correct operation of this part of the apparatus.

As referred to above the use of the clear glass pipework also permits speedy and positive visual inspection of the presence of the water seal under operating conditions and of the interior cleanliness of the pipework system, while the borosilicate glass tubing is highly resistant to corrosion or the deposit or build-up of accumulated matter which might harbour microbiological growth on the inner surfaces of the pipework. The presence of the air break between the second and third pipework section ensures that no siphonic action can be built up which might avoid the fluid seal from trap 30.

If cleaning or maintenance is necessary the components making up the pipework can be uncoupled and readily re-assembled.

To facilitate access to the interior of trap 30 for cleaning or maintenance without having to dismantle the pipework, or for dosing the interior of the trap including the water seal with bactericide or disinfectant the upper extremity of upleg 34 is provided with a removable cap 44, preferably also formed from borosilicate glass and maintained fluid and air tight by a sealing ring e.g. of PTFE.

Another form of drain means is shown in FIG. 3, for example being the drain means 9 or 10 associated with pond 8 of the apparatus shown in FIG. 1. A first pipework section 328 of this drain means is constructed in substantially the same way as the like section shown in FIG. 2 from borosilicate glass tubes to include a U trap 330, a downleg 332 of the latter being connected to receive outflow from a condenser drip tray or pond 8 as in FIG. 1. In this arrangement the top end portion of downleg 332 comprises a T piece 333 for side flow into trap 330 and a removable cap 344 blanks off the upper end of downleg 332, this cap can be removed for cleaning or other access to trap 330 or the dosing of the latter with disinfectant etc, thus the upleg 334 need not have such a capped opening.

A second pipework section of this drain means 336 includes a spout 338 discharging into a third pipework section 340 by way of a tundish 342 to provide an air gap as previously described.

If the outflow from the third pipework section is led into a vertical drain stack of a foul water drainage system e.g. of a building it is preferable that a further water sealed trap 350 is provided between the tundish 342 and the outlet connection and this trap and the tubular components connected therewith leading back to and including tundish 342 are all formed of borosilicate glass with releasable couplings as previously referred to.

The preferred form of coupling for use with the borosilicate glass sections of the pipework above described is shown in FIGS. 4 and 5.

Each component of the borosilicate glass tubing 60, 62 is formed with an externally projecting radial bead at its ends and the coupling 64 shown in more detail in FIG. 5 comprises an annular PTFE sealing linear engaging directly with said beads to form a fluid tight seal therewith, a thicker elastomeric annular outer collar 68 disposed around liner 66 and a metal, e.g. stainless steel, clamp ring 70 which is drawn tight to compress the joint by means of a screwed bolt 72 and nut 74. A short metal bridge strip 76 is positioned across the gap in ring 70 to prevent distortion and bulging of the elastomeric element 68 in that area.

It will be appreciated that other forms of releasable coupling could be employed.

Having now described my invention what I claim is:

1. Air conditioning apparatus including ducting defining a flow passage from an air inlet to an air output and operatively connected to the interior of a structure to be air conditioned, air processing means within the ducting for treatment of the air passing therethrough, air impeller means for inducing a flow of air through the ducting in use, and drain means for removing surplus moisture derived from operation of the apparatus; characterised in that said drain means comprises a first pipework section leading directly from a collector in which said surplus moisture is operatively deposited and including a U-shaped trap having a downleg leading from the collector and an upleg, a fluid seal being operatively maintained in said trap to prevent air flow along said first section; a second pipework section leading laterally from an upper end portion of said upleg to a delivery spout; and a third pipework section including an open topped tundish positioned in use to receive fluid flow from the delivery spout while providing an air gap between the second and third pipework sections to prevent siphonic voiding of the fluid seal in the trap in use, said third section delivering the surplus moisture to an outflow in use; all said pipework sections being formed of circular section clear glass tubular components having high resistance to corrosion and accumulation of deposits and low coefficient of thermal expansion connected by readily releasable couplings incorporating compression seals of flexible material which will not readily support microbiological growth, whereby visual inspection of the integrity of the fluid seal and the cleanliness of the drain means in use is facilitated and to provide ease of dismantling for routine cleaning and disinfection.

2. Apparatus as in claim 1 wherein said glass is borosilicate glass.

3. Apparatus as in claim 1 wherein the third pipework section includes a further U-shaped trap formed of said glass between the tundish and the outflow.

4. Apparatus as in claim 1 wherein one of said legs of the U-shaped trap is provided with an airtight removable cap at its upper end also formed from said glass.

5. Apparatus as in claim 1 wherein said tubular components have externally projecting radial bends at their ends for engagement by the associated couplings.

6. Apparatus as in claim 5 wherein each said coupling comprises an annular sealing liner for direct engagement with said beads, an elastomeric annular outer collar disposed around said liner, and a metal clamp ring drawn tight to compress the joint threaded screw means.

* * * * *